(12) United States Patent
Poland et al.

(10) Patent No.: US 7,433,551 B2
(45) Date of Patent: Oct. 7, 2008

(54) FIBER OPTIC SENSORS SYSTEM

(75) Inventors: Stephen H. Poland, Blacksburg, VA (US); Clark D. Boyd, Radford, VA (US); Brooks A. Childers, Christiansburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/570,001

(22) PCT Filed: Sep. 2, 2004

(86) PCT No.: PCT/US2004/028626

§ 371 (c)(1),
(2), (4) Date: Feb. 28, 2006

(87) PCT Pub. No.: WO2005/024379

PCT Pub. Date: Mar. 17, 2005

(65) Prior Publication Data

US 2007/0009197 A1    Jan. 11, 2007

Related U.S. Application Data

(60) Provisional application No. 60/499,730, filed on Sep. 4, 2003.

(51) Int. Cl.
*G02B 6/00* (2006.01)

(52) U.S. Cl. ..................................... 385/12

(58) Field of Classification Search ............. 385/12; 250/227.11–14
See application file for complete search history.

(56) References Cited

U.S. PATENT DOCUMENTS 4,775,216 A   10/1988   Layton
5,268,741 A * 12/1993   Chou et al. ............. 356/479

(Continued)

FOREIGN PATENT DOCUMENTS

GB         2340227       2/2002

(Continued)

OTHER PUBLICATIONS

International Search Report Issued by ISA/US on Mar. 17, 2005.

(Continued)

*Primary Examiner*—Charlie Peng
(74) *Attorney, Agent, or Firm*—The H.T. Than Law Group

(57) ABSTRACT

A fiber optic system including a plurality of optical sensors, each with an identification system is disclosed. The fiber optic system includes a fiber, a demodulator, and at least one coupler, optical sensor and corresponding identification system. The identification system is powered by light shunted from the fiber by the coupler to a modulating device. The modulating device modulates the light and transmits it to a power converting device, which transforms the light energy into electrical energy. The electrical energy powers a high temperature integrated circuit upon which is stored a digital identification of a respective optical sensor. The integrated circuit, upon being powered up, sends a modulated response back up to the surface through the modulating device. Alternatively, a passive identification system is described, wherein identification information for a sensor is encoded onto the optical beam as it passes through reflective devices along the length of the fiber.

28 Claims, 2 Drawing Sheets

U.S. PATENT DOCUMENTS

| | | | |
|---|---|---|---|
| H1626 H * | 1/1997 | Kersey et al. | 370/479 |
| 5,675,674 A | 10/1997 | Weis | |
| 5,898,517 A * | 4/1999 | Weis | 356/5.09 |
| 6,023,365 A * | 2/2000 | McDonald | 359/291 |
| 6,052,056 A | 4/2000 | Burns et al. | |
| 6,285,806 B1 * | 9/2001 | Kersey et al. | 385/12 |
| 6,361,299 B1 | 3/2002 | Quigley et al. | |
| 6,522,797 B1 | 2/2003 | Siems et al. | |
| 6,545,760 B1 * | 4/2003 | Froggatt et al. | 356/477 |
| 6,560,017 B1 * | 5/2003 | Bianco | 359/566 |
| 2003/0001082 A1 | 1/2003 | Duncan et al. | |

FOREIGN PATENT DOCUMENTS

| | | |
|---|---|---|
| GB | 2372100 | 8/2002 |
| WO | 96/31022 | 10/1996 |
| WO | 99/19693 | 4/1999 |

OTHER PUBLICATIONS

Jeff Hecht, "Understanding Fiber Optics," 99, 158-159 (4th ed., Prentice Hall 2002).

* cited by examiner

FIBER OPTIC SENSORS SYSTEM

FIELD OF THE INVENTION

The invention generally relates to fiber optic sensors, and more particularly to a fiber optic sensor identification system.

BACKGROUND OF THE INVENTION

Available electronic sensors measure a variety of values, such as, pH, color, temperature, or pressure, to name a few. For systems that require a string of electronic sensors over a long distance, e.g., twenty to thirty kilometers or longer, powering the electronic sensors becomes difficult. Conventionally, the powering of electronic sensors requires running electrical wire from a power source to each of the electronic sensors. However, electric wires spanning such long distances create too much interference and noise, thereby reducing the accuracy of the electronic sensors.

Optical fibers have become the communication medium of choice for long distance communication due to their excellent light transmission characteristics over long distances and the ability to fabricate such fibers in lengths of many kilometers. Further, the light being communicated can also power the sensors, thus obviating the need for lengthy amounts of electric wire. This is particularly important in the petroleum and gas industry, where strings of electronic sensors are used in wells to monitor down hole conditions. Powering electronic sensors electrically has been a problem in the petroleum and gas industry.

As a result, in the petroleum and gas industry, fiber optic sensors are used to obtain various down hole measurements, such as, pressure or temperature. A string of optical fibers within a fiber optic system is used to communicate information from wells being drilled, as well as from completed wells.

Conventionally, each sensor in a multi-sensor fiber optic system is calibrated to a particular communication channel. Thus, each sensor sends data back to a dedicated communication channel. Currently, calibration coefficients for each communication channel, which are necessary to ensure that data from a particular sensor is communicated to the proper channel, are manually entered. If a particular channel is defective or, for whatever reason, cannot be used to receive data, the calibration coefficients for the respective sensor have to be manually re-entered into another channel, increasing the possibility of human error.

SUMMARY OF THE INVENTION

The optic sensor system of the present invention includes a sensor connected to a monitoring apparatus. The sensor is also connected to a dedicated identification device. The monitoring apparatus sends an optical signal to the sensor, and a return optical signal from the sensor includes a unique identifier from the identification device.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

Figure 1:
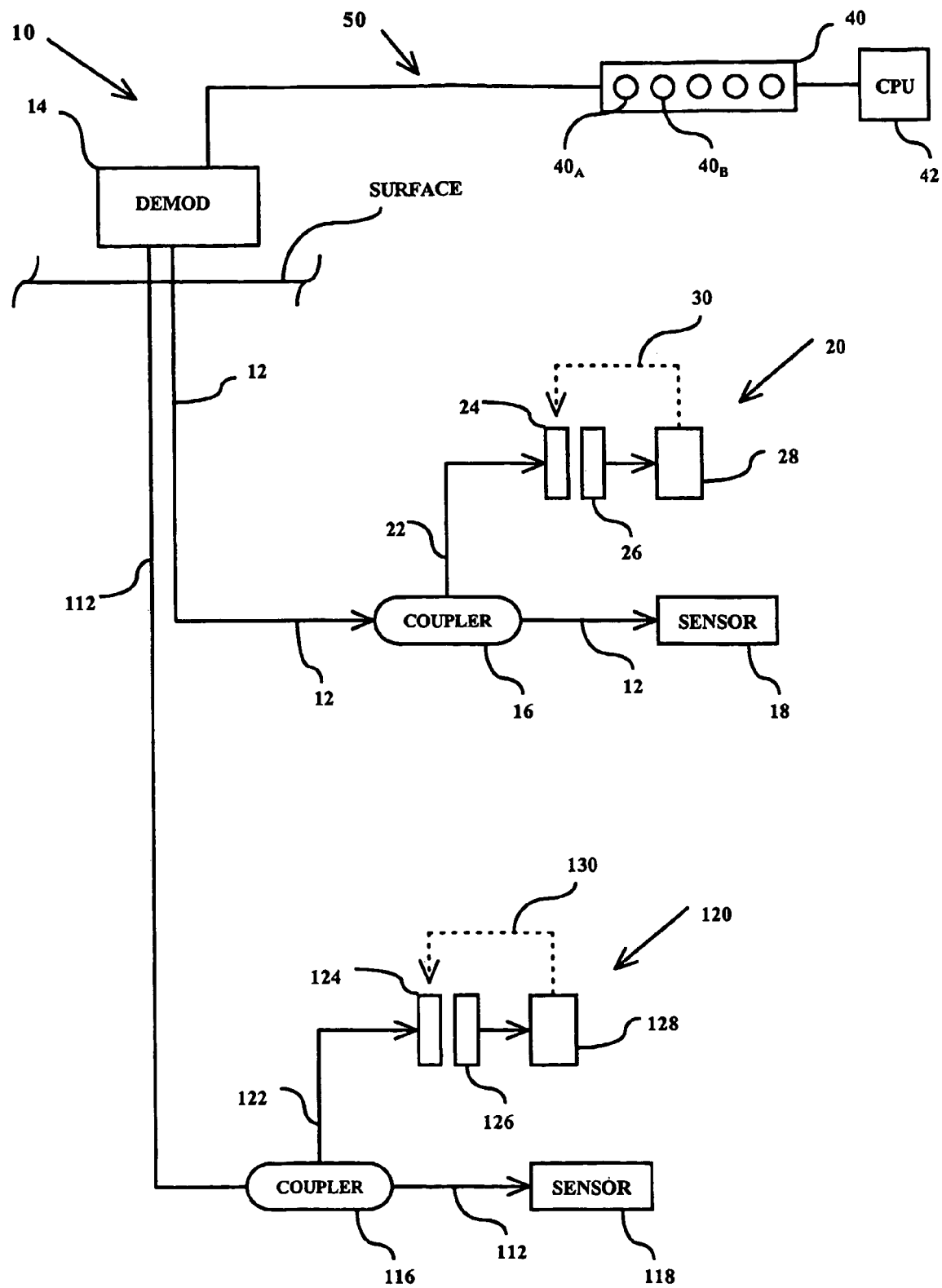
FIG. 1 is a schematic view of a fiber optic system having identification systems constructed in accordance with an exemplary embodiment of the invention.

Referring to FIG. 1, a fiber optic system 10 is shown. System 10 includes a monitoring apparatus 50 including a channel array 40 and a central processing unit 42 in connection with an interrogator 14 located at the surface. Preferably, interrogator 14 is a demodulator. A first fiber 12 extends from demodulator 14 down to a first sensor 18. Also illustrated is a second fiber 112 extending down to a second sensor 118. It should be appreciated that the number of fibers 12, 112 extending down hole from demodulator 14 is not fixed and is a sufficient number of fibers to allow communication between a number of sensors 18, 118 down hole with demodulator 14.

Sensors 18, 118 are each associated with a respective, dedicated identification system 20, 120. Identification system 20 includes a coupler 16, a shunt line 22, a modulating device 24, a power converting device 26, and a high temperature integrated circuit 28. Identification system 120 similarly includes a coupler 116, a shunt line 122, a modulating device 124, a power converting device 126, and a high temperature integrated circuit 128.

Monitoring apparatus 50 may be a standard stationary monitoring apparatus, or it may be a portable monitoring apparatus that is transported from well to well for the purpose of obtaining data from each respective well. For example, a portable monitoring apparatus 50 may be coupled with a first well, at which relevant data from the well, taken and reported by sensors 18, 118, is obtained. Then, the portable monitoring apparatus 50 may be decoupled from the first well, moved to a second well, and coupled with the second well to obtain like information.

After monitoring apparatus 50 has been coupled with a well, it is important to ascertain which sensors are associated with which channel in channel array 40. As shown, two channels $40_A$ and $40_B$ are denoted. To ascertain which sensor 18, 118 is associated with which fiber 12, 112, a signal is sent from demodulator 14 down fiber 12. The light signal, travels through fiber 12 to coupler 16, where a majority of the light continues along fiber 12 to sensor 18. A portion of the light, such as about ten percent (10%), is shunted off onto fiber optic shunt line 22 toward modulating device 24.

Modulating device 24 may modulate through any suitable mechanism, such as through electro-optical or microelectromechanical (MEMS) means. Modulating device 24 causes periodic intensity variations in the light reflected back to demodulator 14 through coupler 16 in response to the light sent from demodulator 14 to identification system 20. In other words, the intensity variations only occur when individual sensor 18 is addressed. The modulation occurs as a result of changing the properties of the optical path. This can be accomplished by inserting a reflector in the path with a MEMS device or changing the polarization with an LCD device.

The light transmitted through shunt line 22 is transmitted through modulating device 24 and converted into electrical energy by power converting device 26. Alternatively, the light transmitted through shunt line 22 may be transmitted directly to power converting device 26 for conversion into electrical energy. A suitable power converting device 26 may be a photocell. Power converting device 26 may include an anti-reflective coating which provides a minimum and constant amount of reflection to minimize interference with fiber optic sensor 18.

The now converted electric energy powers integrated circuit 28. Information identifying the particular sensor 18 to which identification system 20 is coupled is stored on integrated circuit 28. Integrated circuit 28 may be a standard high temperature integrated circuit such as those manufactured by Honeywell and rated to 200° C. for a ten year mean time before failure (MTBF). Alternatively, integrated circuit 28 may include one of various more exotic constructions, such as sapphire or diamond, which are rated for higher than 200° C. for a ten year MTBF.

The electrical energy, which comes from power converting device 26 to integrated circuit 28, provides power to integrated circuit 28 to allow it to send the identifying information back to the surface. In response to the electrical energy, integrated circuit 28 sends a modulating response 30 back to modulating device 24. Modulating response 30 may be as simple as a digital identification number corresponding to relevant sensor 18 or as complex as all the calibration data for relevant sensor 18. Modulating device 24 forwards modulating response 30 back through coupler 16 and up fiber 12 to demodulator 14 on the surface. The identifying information is used to verify that sensor 18 is associated with fiber 12 and is calibrated to a particular channel, such as channel $40_A$. A similar exercise is then accomplished with fiber 112 to verify that sensor 118 is associated with fiber 112.

In operation, a light signal is transmitted through fiber 12 by monitoring apparatus 14 to coupler 16 corresponding with a particular sensor 18 and its respective identification system 20. The signal is for only a specific sensor, and thus only its respective identification system 20 will be enabled to respond. A portion of the light is shunted away from fiber 12 leading to sensor 18 and onto optical fiber shunt line 22. The shunted light passes through modulating device 24, such as a liquid crystal display, which then transmits the light to power conversion device 26, such as a photocell. Photocell 26 transforms the light energy into electrical energy and sends the electrical energy in pulses toward the high temperature integrated circuit 28.

Now powered by the electrical energy, and in response to the pulsed signal provided by photocell 26, integrated circuit 28 sends a modulating response 30 to modulating device 24. Modulating response 30 is determined by the digital information contained in integrated circuit 28. Integrated circuit 28 does not send any information until the proper sequence of pulses is first received from photocell 26. The pulse sequence is a trigger or command for the sensor circuit to send one or more packets of information. Modulating response 30 is then transmitted back up to the surface.

Alternatively, modulating device 24 may be pre-set to reflect the shunted light at a particular intensity, which intensity correlates to a particular sensor 18. For example, modulating device 24 may be a digital micromirror device (DMD), such as those available from Texas Instruments. While most DMDs are dynamically controlled, i.e., the individual micromirrors in the array are toggled in real time to drive the modulation of the optical beam, a DMD may also be passive. In this case, the individual micromirrors are set into a particular configuration which is not altered thereafter. Central processing unit 42 can be pre-programmed to recognize the signature generated by the modulation caused by a particular DMD to identify a particular sensor. For example, central processing unit 42 may contain memory that stores a database of signatures and corresponding sensors as well as calibration data related to those sensors. By comparing the detected signal to the signatures in the database, sensor 18 may be identified.

Additionally, the digital information contained in integrated circuit 28 can also be stored in central processing unit 42. When the information identifying the sensor is stored in the central processing unit 42 or the monitoring device 50, dedicated channels $40_A$, $40_B$ may be omitted. The measurement readings from sensors 18, 118 are continually coupled with or are associated with the identifying information, thereby associating the measurements to the sensor without the need for a dedicated channel.

Figure 2:
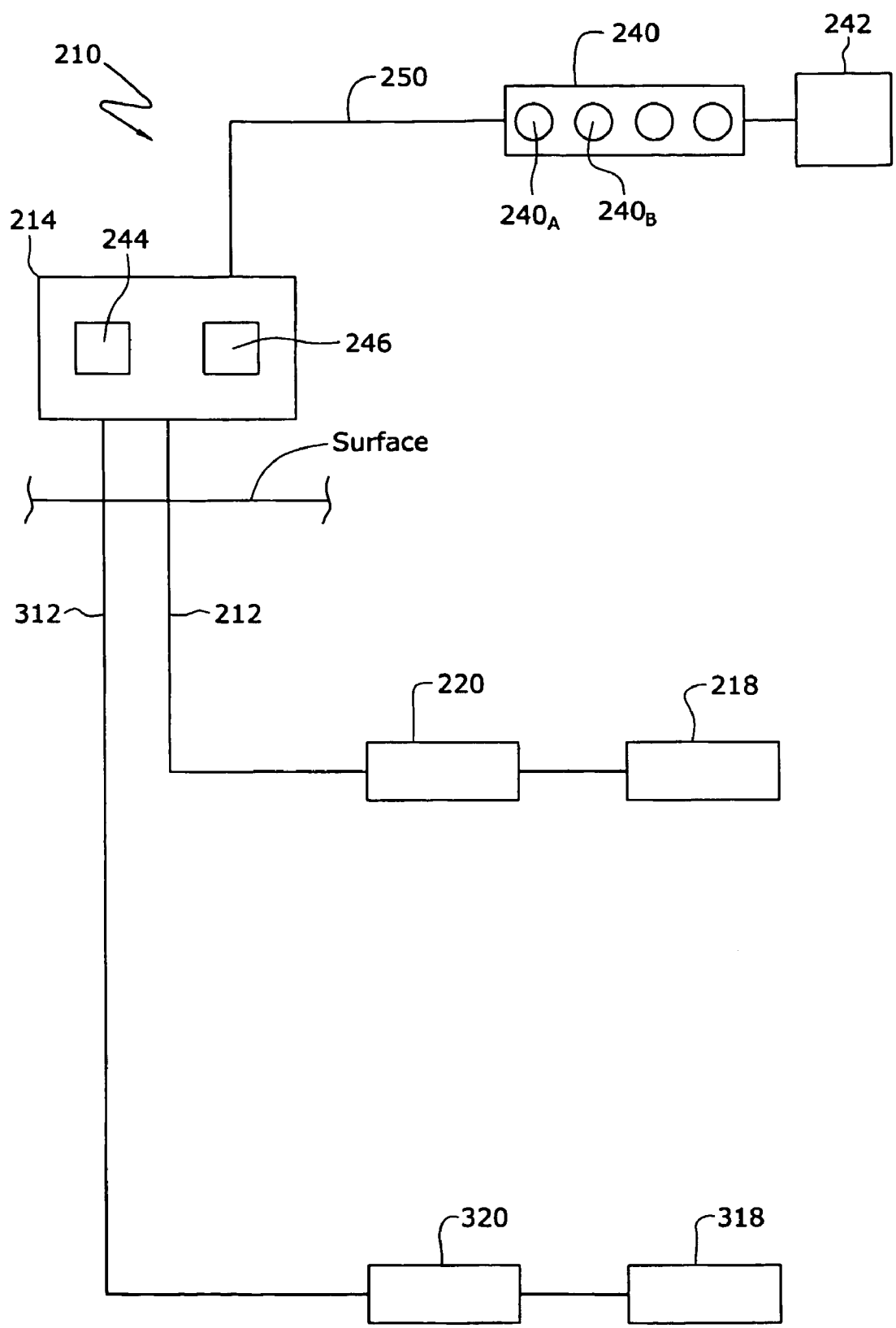
FIG. 2 is a schematic view of an alternate embodiment of a fiber optic system having identification systems.

In another embodiment, shown in FIG. 2, a fiber optic system 210 is includes a monitoring apparatus 250 that includes a channel array 240 and a central processing unit 242 at the surface, similar to channel array 40 and central processing unit 42 discussed above with respect to FIG. 1.

Monitoring apparatus 250 also includes at the surface an interrogator 214. Preferably, interrogator 214 is an optical frequency domain reflectometer (hereinafter, "OFDR"). Such devices are known in the art, and OFDRs typically utilize swept-wavelength interferometry to interrogate systems and/or devices. OFDR 214 may be any OFDR known in the art, such as those available from Luna Technologies Inc. of Blacksburg, Va. OFDR 214 includes at least a light source 244 and a detector 246. Although shown in FIG. 2 as separate components, alternatively, OFDR 214 may also incorporate channel array 240 and/or central processing unit 242 within a single unit (not shown).

A first fiber 212 connects OFDR 214 to a first sensor 218. Similarly, a second fiber 312 connects OFDR 214 to a second sensor 318. More sensors may be utilized as desired, depending upon the well system to be monitored. Associated with each sensor 218, 318 is a dedicated identification device 220, 320, respectively. For clarity of description, the arrangement of system 210 with respect to sensor 218 is described; the other sensors within system 210 are arranged in a similar manner.

Identification device 220 is preferably a fiber Bragg grating (FBG), although the use of any reflective medium capable of causing intensity or frequency variations or phase shift within a light beam is appropriate for use with the present invention. Identification device 220 is preferably placed in series with sensor 218 on fiber 212. As would be apparent to those skilled in the relevant art, identification device 220 may be a separate FBG that is optically coupled with fibers 212. Alternatively, identification device 220 may also be written directly into fiber 212, or incorporated into sensor 218. FBGs that modulate or reflect light to encode signals are known in the art.

Encoded into identification device 220 is information related to their respective associated sensor 218 such as a serial number, calibration data, or the like. Preferably, a binary "bit" is written in a specific spatial location in fiber 212. In other words, at a given location along the length of fiber 212, a value of one or zero is encoded, where "one" is the presence of a grating pattern or other reflective device and "zero" is the absence of a grating pattern or other reflective device. A series of bits at pre-determined locations within fiber 212 contain all of the desired information, such as numbers in a serial code or a calibration coefficient. Each encoded location could be specified to be, for the purposes of example only, 1 cm apart starting at a specific point in fiber 212. A series of bits could correspond to a particular digit in the sensor serial number or calibration coefficient. Any known binary coding scheme could be employed.

In operation, OFDR 214 interrogates sensor 218 by passing an optical signal through identification device 220 as the light travels to and from sensor 218. Both sensor 218 and identification device 220 alter the optical beam to encode data therewithin. The signal is then reflected back to OFDR 214, where the signal is detected. In addition to the information gathered from sensor 218, OFDR 214 detects the encoded identification information reflected from identification device 220. The information is then transmitted to central processing unit 242. Central processing unit 242 is programmed with the predetermined bit spacing and format, and the necessary fiber sensor identification or calibration information can then be extrapolated. Sensor 218 may then be identified, calibrated, and assigned to a specific channel 240$_A$ within channel array 240. A similar process is performed for sensor 318 using identification device 320 to assign sensor to a channel 240$_B$, as well as any other sensors included with system 210. Alternatively, as the encoded information from identification device 220, 320 is transmitted with each interrogation, central processing unit 242 may be programmed to determine the sensor of origin of the signal with each interrogation. In such a case, sensor 218 would not be assigned to a dedicated channel.

Alternatively, identification device 220 may be the optical fiber lead to sensor 218. As is known in the art, Rayleigh scattering, the scattering of light by the particles of the material through which the light is transmitted, occurs in optical fiber transmissions. When sensor 218 is manufactured, the unique Rayleigh scattering profile of the lead is scanned with an OFDR. This Rayleigh scattering profile, which remains fixed throughout the usable life of sensor 218, is recorded and stored in a database in central processing unit 240. Sensor 218 is deployed down hole by splicing the lead onto fiber 212 or coupling the lead thereto using a mechanical coupler. After sensor 218 is deployed down hole, OFDR 214 interrogates sensor 218 and compares the received Rayleigh scattering profile with the database, thereby identifying the scanned sensor as sensor 218.

Yet another manner in which the lead to sensor 218 may be used as identification device 220 is to intentionally vary the length of the leads for all sensors in system 210 in a known fashion. In a typical multi-sensor system, care is taken to splice all leads the same length and to ensure invisibility of the splice. However, for use as identification device 220, the splice is intentionally made visible to the interrogation beam. Using sensor 218 as a reference reflector, the distance between the splice and sensor 218 is measured. This measurement is then compared with a database of sensor lead lengths stored in central processing unit 242 in order to identify the scanned sensor as sensor 218.

Another alternative for identification device 220 is a spectral filter. OFDR 214 preferably employs a tunable laser as the light source. This laser cycles through the available channels at specified increments. A typical OFDR utilizes hundreds of channels. Identification device 220 can remove a pre-determined portion of the channel spectrum, thereby providing a signature to identify sensor 218.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

We claim:

1. An optic sensor system comprising:
  an optical sensor outputting an optical signal connected to a monitoring apparatus and an identification device dedicated to the sensor, wherein the optical sensor is capable of returning a return optical signal, which includes a unique identifier from the identification device when the monitoring apparatus sends an interrogating optical signal to the optical sensor, wherein the interrogating optical signal reaches the optical sensor in a substantially unaltered waveform.

2. The optic sensor system of claim 1, wherein the identification device is connected in series with the sensor.

3. The optic sensor system of claim 1, wherein the identification device comprises a Bragg grating.

4. The optic sensor system of claim 3, wherein the unique identifier comprises a modulated frequency of the return optical signal.

5. The optic sensor system of claim 1, wherein the identifier comprises a Rayleigh scattering pattern unique to said sensor.

6. The optic sensor system of claim 5, wherein the monitoring apparatus stores said unique Rayleigh scattering pattern and compares the stored pattern to the pattern associated with the return optical signal to identify the sensor.

7. The optic sensor system of claim 1, wherein the identification device is connected to the sensor through a coupler.

8. The optic sensor system of claim 7, wherein the identification device comprises a modulating device that modulates the return optical signal at a varied intensity.

9. The optic sensor system of claim 7, wherein the identification device comprises an integrated circuit capable of storing unique information about the sensor.

10. The optic sensor system of claim 9, wherein the integrated circuit is powered by electrical power converted from at least a portion of the optical signal.

11. The optic sensor system of claim 10, wherein the identification device comprises an optical to electrical power converter.

12. The optic sensor system of claim 9, wherein about 10% of the optical signal is shunted off for conversions to electrical power.

13. The optic sensor system of claim 8, wherein the modulating device comprises a MEMS device.

14. The optic sensor system of claim 13, wherein the modulating device comprises a DMD.

15. The optic sensor system of claim 1, wherein the monitoring apparatus comprises an optical frequency domain reflectometer.

16. The optic sensor system of claim 15, wherein the identification device comprises several reflective devices placed an optical fiber length in series.

17. The optic sensor system of claim 16, wherein the monitoring apparatus is programmed with the anticipated location of the reflective devices along the length of the fiber, and wherein the presence or absence of the reflective device is interpreted as data related to the sensor.

18. The optic sensor system of claim 1, wherein the identification device comprises a spectral filter.

19. The optic sensor system of claim 1, wherein the monitoring apparatus is permanently connected to a well.

20. The optic sensor system of claim 1, wherein the monitoring apparatus is removably connected to a well.

21. The optic sensor system of claim 1, wherein the identification device contains a sensor serial number.

22. The optic sensor system of claim 1, wherein the identification device contains sensor calibration data.

23. The optic sensor system of claim 1, wherein the unique identifier comprises a modulated frequency of the return optical signal.

24. The optic sensor system of claim 1, wherein the identification device comprises a modulating device that modulates the return optical signal at a varied intensity.

25. The optic sensor system of claim 1, wherein the identification device comprises several reflective devices placed on an optical fiber length in series.

26. The optic sensor system of claim 25, wherein the monitoring apparatus is programmed with the anticipated location of the reflective devices along the length of the fiber, and wherein the presence or absence of the reflective device is interpreted as data related to the sensor.

27. The optic sensor system of claim 1, wherein the identification device comprises a binary number written on an optical fiber segment.

28. The optic sensor system of claim 1, wherein only one said optical sensor and one said identification device are located on a branch of optical fiber.

* * * * *